T. Hyatt

Vault Cover,

No. 303. Reissued Apr. 3, 1855.

Witnesses:

W. H. Bishop

Andrew De Lacy

Inventor:

Thaddeus Hyatt

N. PETERS, PHOTO-LITHOGRAPHER, WASHINGTON, D. C.

UNITED STATES PATENT OFFICE.

THADDEUS HYATT, OF NEW YORK, N. Y.

IMPROVEMENT IN VAULT-COVERS.

Specification forming part of Letters Patent No. 4,266, dated November 12, 1845; Reissue No. 303, dated April 3, 1855.

*To all whom it may concern:*

Be it known that I, THADDEUS HYATT, of the city, county, and State of New York, have invented certain new and useful improvements in illuminating vault-covers for the closing of openings from streets or yards into vaults, and through the decks of ships, as well as in other situations where it is required to admit light and exclude rain, &c., of which the following is a full, clear, and exact description, reference being had to the accompanying drawings, making part of this specification, in which—

Figure 1:
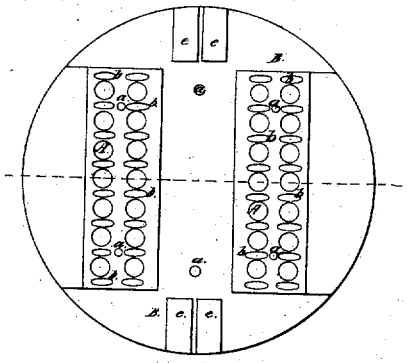
Figure 4:
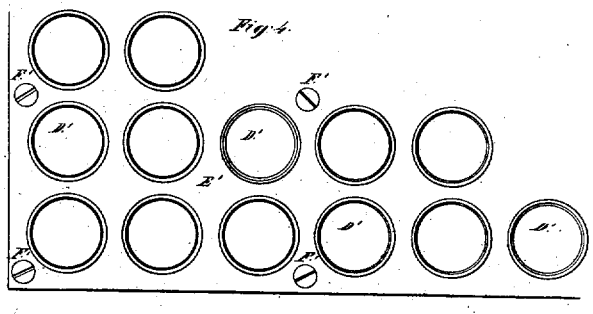
Figure 2:
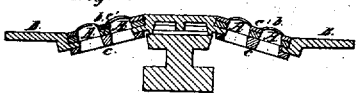
Figure 5:
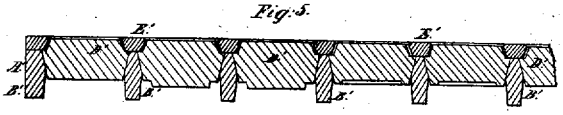
Figure 7:
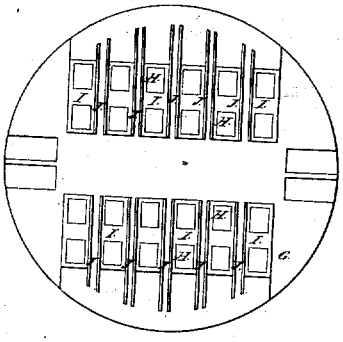
Figure 8:
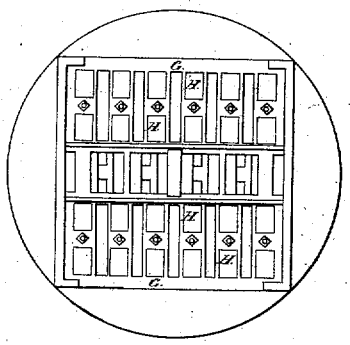

Figure 1 is a plan or top view of a vault-cover on my improved plan; Fig. 2, a vertical section thereof, and Fig. 3 a bottom view. Fig. 4 is a plan of a modification of my said invention; Fig. 5, a vertical section thereof, and Fig. 6 a bottom view. Fig. 7 is a plan of another modification of the said invention; Fig. 8, a bottom view thereof, and Fig. 9 a section.

The illuminating-covers used for the purposes above enumerated as constructed prior to my said invention consisted of a metallic rim made to contain a large plano-convex glass. As these glasses in most places had to be walked over, and were exposed to the passage over them of heavy and rough bodies, and often to heavy blows, it was necessary that they should be made of great thickness, for when broken a large hole was thus opened, dangerous to persons passing over them, and at the same time exposing the vault, room, cabin, &c., to rain, fire, &c. The great thickness of such glass obstructed the light, which evil was increased by the scratching of the entire surface necessarily exposed; but, notwithstanding the greatest practical thickness of glass adopted, they were still much exposed to breakage and all its consequences. Another difficulty was that, by reason of the great size, the expansion and contraction of the surrounding metallic rim by changes of temperature rendered it impracticable to make the junction of the glass and metal water-tight.

By my invention all the above difficulties are avoided; and my said invention consists in making such covers of a metallic grating or perforated metal plate with numerous small holes or apertures for the reception of glass of such size that, without the insertion of glass, persons can walk over them with entire safety, thus employing the metallic grating or perforated plate for the support of persons or bodies passing over or falling upon them, while the apertures for the admission of light are provided with or closed up by glass for the sole purpose of protection against water, fire, &c. Thus greater strength and security against burglary is obtained by substituting the strength and toughness of metal for the fragility of glass. More light can be admitted, notwithstanding a portion of the area is occupied by the grating, for the reason that much thinner glass can be used, more readily disposed to spread the light to advantage, and, if desired, can be partially protected against scratching; and what is also of practical importance, water-tight joints can be secured, because the area of each piece of glass is so small that the expansion and contraction of the metal will not affect the joint.

Figure 3:
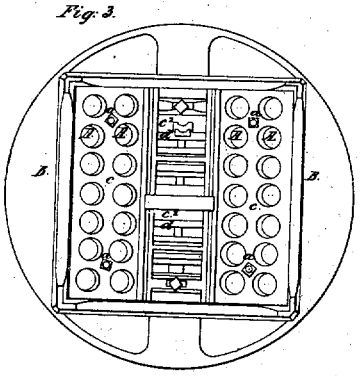

In Figs. 1, 2, and 3 of the accompanying drawings, A A are the glasses or lenses, of which I have shown twenty-eight in four rows, as set in a cast-iron plate, B B. Those lenses that I have actually made have been about seven eighths of an inch in diameter, but they may safely be made of double this diameter, or more, and where the ventilator is not wanted they may of course be made to occupy the part where that is shown as being situated. In the section Fig. 2 the form which I have given to the glasses is that of lenses, and the manner of setting them in wood is fully represented.

*c c′* are two laminæ of wood, in the uppermost of which the lenses are affixed in such manner as that their convex faces shall project above the surface of the iron casting. The lowermost piece bears on the edges of the lenses and keeps them in place. The whole are confined together by screws and screw-nuts *a a*.

On the face of the plate B B, on each side of the lenses, there are cast knobs or protuberances *b b*, which should rise a trifle higher than the most convex part of the lenses, and which will thus effectually protect them from injury. If preferred, the piece *c′*, that holds the glasses or lenses, may be made of lead, pewter, or other soft metal. I prefer to make my illuminating-glasses circular and convex on one side, as represented; but they may be made square or in other forms and have their faces flat. I do not intend, therefore, to limit myself to any particular number or form of the glasses.

In Fig. 3 the manner of fixing the ventilator is shown. It is made similar to the lattice ventilator or damper in common use, consisting of two perforated plates, $c^2$ and $d$, one of which slides upon the other, so as to admit or prevent the passage of air. The air or vapor passes in or out at openings provided at *e e* in the plate B B. These openings have ledges on their lower sides, which prevent the influx of water from rain, excepting the pavements were actually flooded.

Figure 6:
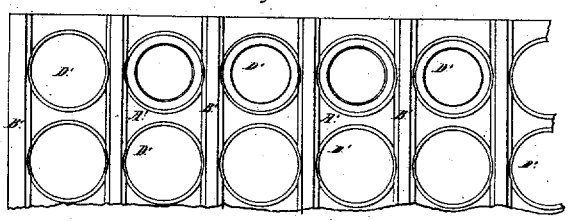

In Figs. 4, 5, and 6, A′ represents a metal plate, with ribs B′ below to give additional strength when required, and with rows of holes between the ribs in which the glass lenses or blocks D′ are inserted with suitable mastic or other substance interposed to secure water-tight joints. The lenses or blocks of glass are molded or pressed of a slightly conical shape, so as to set in the holes, and then over the whole is placed another plate, E′, corresponding in size to the plate A′, and having corresponding holes to fit over the glasses. This plate is secured to the bottom plate by screws or bolts F′ at proper intervals. An illuminating-grating or perforated plate thus constructed, and provided with numerous glasses, which can be made of any desired size to cover openings to vaults, areas, or in floors, so as to give abundant light, exclude water, &c., and give ample support independently of any support from the glass.

Figure 9:
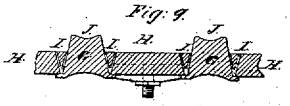

Figs. 7, 8, and 9 represent a vault-cover similar to that represented by Figs. 1, 2, and 3, but instead of the laminæ of wood below for securing the glass lenses to the perforated plate above, in this modification the perforated plate G is a continuation of the vault-cover. The holes are suitably rabbeted from above to receive square or other formed blocks of glass H, which are inserted with suitable cement or other packing to secure water-tight joints, and then held down by cap-plates of thin metal, I, secured by screws or bolts to the plate below. In this modification the protuberances J on the upper surface for the protection of the glass are parallel ribs which, while they form supports for persons or bodies passing over, admit of washing or brushing off dirt, &c. In this way it will be readily seen that covers for vaults, areas, cellars, and other such like places can be made of any desirable size with any extent of illuminating-surface of thin glass which will be perfectly safe to pass over, notwithstanding all the glass may be broken out, while at the same time the joints will not be disturbed by the expansion of the metal by reason of the small size of the metal surrounding each glass.

I have herein specified three modes in which the principle or character of my invention may be applied; but it will be obvious that other modifications may be made coming within the range or scope of the said principle.

What I claim as my invention, and desire to secure by Letters Patent in covers for openings to vaults, in floors, decks, &c., is—

1. Making them of a metallic grating or perforated metallic plate, with the apertures so small that persons or bodies passing over or falling on them may be entirely sustained by the metal, substantially as described; but this I only claim when the apertures are protected by glass, substantially as and for the purpose specified.

2. In combination with the grating or perforated cover and glass fitted thereto, the knobs or protuberances on the upper surface of the grating or perforated plate for preventing the abrasion or scratching of the glass, substantially as specified.

THADDEUS HYATT.

Witnesses:
WM. H. BISHOP,
ANDREW DE LACY.